(12) United States Patent
Tsai et al.

(10) Patent No.: US 11,184,209 B1
(45) Date of Patent: Nov. 23, 2021

(54) SIGNAL PROCESSING CIRCUIT IN DIGITAL DOMAIN AND METHOD THEREOF

(71) Applicant: Realtek Semiconductor Corp., HsinChu (TW)

(72) Inventors: Yun-Chih Tsai, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/315,363

(22) Filed: May 10, 2021

(30) Foreign Application Priority Data

Jun. 10, 2020 (TW) .................................. 109119545

(51) Int. Cl.
*H04L 27/01* (2006.01)
*H04L 27/26* (2006.01)
*H04L 25/03* (2006.01)

(52) U.S. Cl.
CPC .... *H04L 27/2628* (2013.01); *H04L 25/03057* (2013.01)

(58) Field of Classification Search
CPC ........... H04L 27/2628; H04L 25/03057; H04L 25/03159; H04L 2025/03541; H04L 25/03019
See application file for complete search history.

(56) References Cited

U.S. PATENT DOCUMENTS

| | | | | |
|---|---|---|---|---|
| 7,391,833 B2* | 6/2008 | Kim | .................... | H04L 25/0228 375/351 |
| 8,472,510 B2* | 6/2013 | Li | .................... | H04L 25/03019 375/231 |
| 2009/0044230 A1* | 2/2009 | Oh | .................... | H04N 19/61 725/62 |
| 2010/0061495 A1* | 3/2010 | Cho | .................... | H04L 25/022 375/346 |
| 2021/0226825 A1* | 7/2021 | Su | .................... | H04L 25/03057 |

FOREIGN PATENT DOCUMENTS

EP            3 021 489 B1      9/2019

\* cited by examiner

*Primary Examiner* — David S Huang
(74) *Attorney, Agent, or Firm* — Winston Hsu (57) ABSTRACT

A signal processing method in a digital-domain includes: adding a random number sequence signal into a time-domain input signal to generate a time-domain processed input signal; performing a Fourier transform operation upon the time-domain processed input signal to generate a frequency-domain processed input signal; performing an equalizer operation upon the frequency-domain processed input signal to generate a frequency-domain output signal according to coefficients of the equalizer operation; performing an inverse Fourier transform operation upon the frequency-domain output signal to generate a time-domain output signal; generating a decision output signal and generating a time-domain error signal according to the time-domain output signal; and determining the coefficients according to the time-domain error signal and the frequency-domain processed input signal.

20 Claims, 6 Drawing Sheets

SIGNAL PROCESSING CIRCUIT IN DIGITAL DOMAIN AND METHOD THEREOF

BACKGROUND OF THE INVENTION

1. Field of the Invention

The present invention relates to digital signal processing architecture, and more particularly, to a signal processing circuit in a digital domain and a method thereof.

2. Description of the Prior Art

Generally speaking, in high-speed data transmission systems (e.g., Ethernet 2.5G/5G/10G systems), system architecture of Frequency-domain Block Least Mean Squares (FBLMS) is usually used, and a fixed-point arithmetic of finite word length is used in actual systems. However, in an actual system that uses FBLMS with fixed-point arithmetic, quantized noise will be introduced into an operation of a Fourier transform circuit. If the number of bits used by the Fourier transform circuit is small, the output is extremely prone to noise. Since the Fourier transform circuit has the most occupied circuit area in a system and is the most energy-consuming part in the system, it is actually impossible to suppress the influence of quantization noise by continuously increasing the number of bits used. When the number of bits in the Fourier transform circuit is small for saving circuit area or for the purpose of energy saving, if the word length is not enough, a specific colored noise pattern will be generated during a process between the operation of the Fourier transform circuit and the operation of an inverse Fourier transform circuit, wherein the specific colored noise pattern affects the operation of a decision feedback equalizer, and then affects the feedback control of the equalizer. In a worst case, the equalizer coefficient drifts, and the entire system is unstable and cannot converge.

SUMMARY OF THE INVENTION

Therefore, an objective of the present invention is to provide a signal processing circuit in a digital domain and a method thereof, to solve the problems of the traditional architecture.

According to an embodiment of the present invention, a signal processing circuit in a digital domain is disclosed. The signal processing circuit comprises a processing unit, a first Fourier transform circuit, an equalizer, a first inverse Fourier transform circuit, a decision circuit, and a feedback circuit. The processing unit is arranged to receive a time-domain input signal, and generate a time-domain processed input signal by adding a random number sequence signal to the time-domain input signal. The first Fourier transform circuit coupled to the processing unit is arranged to receive the time-domain processed input signal, and generate a frequency-domain processed input signal by performing a first Fourier transform on the time-domain processed input signal. The equalizer is arranged to receive the frequency-domain processed input signal, and generate a frequency-domain output signal by performing an equalizer operation on the frequency-domain processed input signal according to an equalizer parameter. The first inverse Fourier transform coupled to the equalizer is arranged to receive the frequency-domain output signal, so as to generate a time-domain output signal by performing a first inverse Fourier transform on the frequency-domain output signal. The decision circuit coupled to the first inverse Fourier transform circuit is arranged to generate a decision output signal according to the time-domain output signal, and generate a time-domain error signal according to the decision output signal and the time-domain output signal. The feedback circuit coupled to the decision circuit and the equalizer is arranged to generate a specific parameter signal in order to determine the equalizer parameter of the equalizer according to the time-domain error signal and the frequency-domain processed input signal.

According to an embodiment of the present invention, a signal processing circuit in a digital domain is further disclosed. The signal processing circuit comprises a random number sequence generating circuit, a first addition unit, a first Fourier transform circuit, a first equalizer, a first inverse Fourier transform circuit, a second addition unit, a second Fourier transform circuit, a second equalizer, a second inverse Fourier conversion circuit and a decision circuit. The random number sequence generating circuit is arranged to generate a first near-end random number sequence signal and a first far-end random number sequence signal, wherein the first near-end random number sequence signal corresponds to a first transmitting wire, the first far-end random number sequence signal corresponds to a first receiving wire, and the first transmitting wire and the first receiving wire are a pair of transmitting/receiving wires. The first addition unit is arranged to receive the first near-end random number sequence signal and a digital-domain transmission signal corresponding to the first transmitting wire, and generate a first time-domain processed transmission signal by adding the first near-end random number sequence signal to the digital-domain transmission signal corresponding to the first transmitting wire. The first Fourier transform circuit is coupled to the first addition unit, and arranged to convert the first time-domain processed transmission signal into a first frequency-domain processed transmission signal. The first equalizer is coupled to the first Fourier transform circuit, and is arranged to generate a first equalized transmission signal by performing a first equalization compensation on the first frequency-domain processed transmission signal. The first inverse Fourier transform circuit is coupled to the first equalizer, and arranged to generate a time-domain equalized transmission result signal according to the first equalized transmission signal. The second addition unit is coupled to a digital-domain reception signal corresponding to the first receiving wire output by an analog-to-digital converter and to the first inverse Fourier transform circuit, and arranged to generate a first time-domain processed reception signal by adding the time-domain equalized transmission result signal and the first far-end random number sequence signal to the digital-domain reception signal. The second Fourier transform circuit is coupled to the second addition unit, and arranged to transform the first time-domain processed reception signal into a first frequency-domain processed reception signal. The second equalizer is coupled to the second Fourier transform circuit, and is arranged to generate a first equalized reception signal by performing a second equalization compensation on the first frequency-domain processed reception signal. The second inverse Fourier transform circuit is coupled to the second equalizer, and arranged to generate a time-domain output signal according to the first equalized reception signal. The decision circuit coupled to the second inverse Fourier transform circuit is arranged to generate a decision output signal according to the time-domain output signal, and generate a time-domain error signal according to the decision output signal and the time-domain output signal, so as to determine an equalizer parameter of the second equalizer by feedback.

According to an embodiment of the present invention, a signal processing method in a digital domain is further disclosed. The method includes: receiving a time-domain input signal, generating a time-domain processed input signal by adding a random number sequence signal to the time-domain input signal; receiving the time-domain processed input signal, and generating a frequency-domain processed input signal by performing a first Fourier transform on the time-domain processed input signal; receiving the frequency-domain processed input signal, and generating a frequency-domain output signal by performing an equalizer operation on the frequency-domain processed input signal according to an equalizer parameter; receiving the frequency-domain output signal, and generating a time-domain output signal by performing a first inverse Fourier transform on the frequency-domain output signal; generating a decision output signal according to the time-domain output signal, and generating a time-domain error signal according to the decision output signal and the time-domain output signal; and generating a specific parameter signal according to the time-domain error signal and a conjugate signal of the frequency-domain processed input signal, wherein the specific parameter signal determines the equalizer of the equalizer parameter.

These and other objectives of the present invention will no doubt become obvious to those of ordinary skill in the art after reading the following detailed description of the preferred embodiment that is illustrated in the various figures and drawings.

DETAILED DESCRIPTION

In a high-speed data transmission system such as an Ethernet 2.5G/5G/10G system, the present invention provides a system architecture of frequency-domain Block Least Mean Squares (FBLMS) to avoid an excessively long channel response. The present invention aims at stabilizing a system by adding an artificially generated noise to an original digital input signal before the original digital input signal is inputted to a Fourier transform circuit. For example, in practice, the noise can be a random number sequence (which is a white noise on spectrum, but not limited), wherein a data signal of the random number sequence can be arranged to make spectral power/energy of the data signal of the random number sequence be/become higher than spectral power/energy of a measured specific noise pattern, so as to mask the energy of the specific noise pattern, and avoid accumulation of the energy of the specific noise pattern at a certain frequency in an output of the Fourier transform circuit. In addition, in practice, it can mask bit data (e.g., one or more Least Significant Bits (LSBs)) of the original digital input signal to equivalently achieve an effect of adding an artificially generated noise to the original digital input signal. In addition, the present invention can also be applied to a high-speed transmission communication system with multiple channels. By way of example, but not limitation, the high-speed transmission communication system with multiple channels may be the aforementioned Ethernet 2.5G/5G/10G system.

Figure 1:
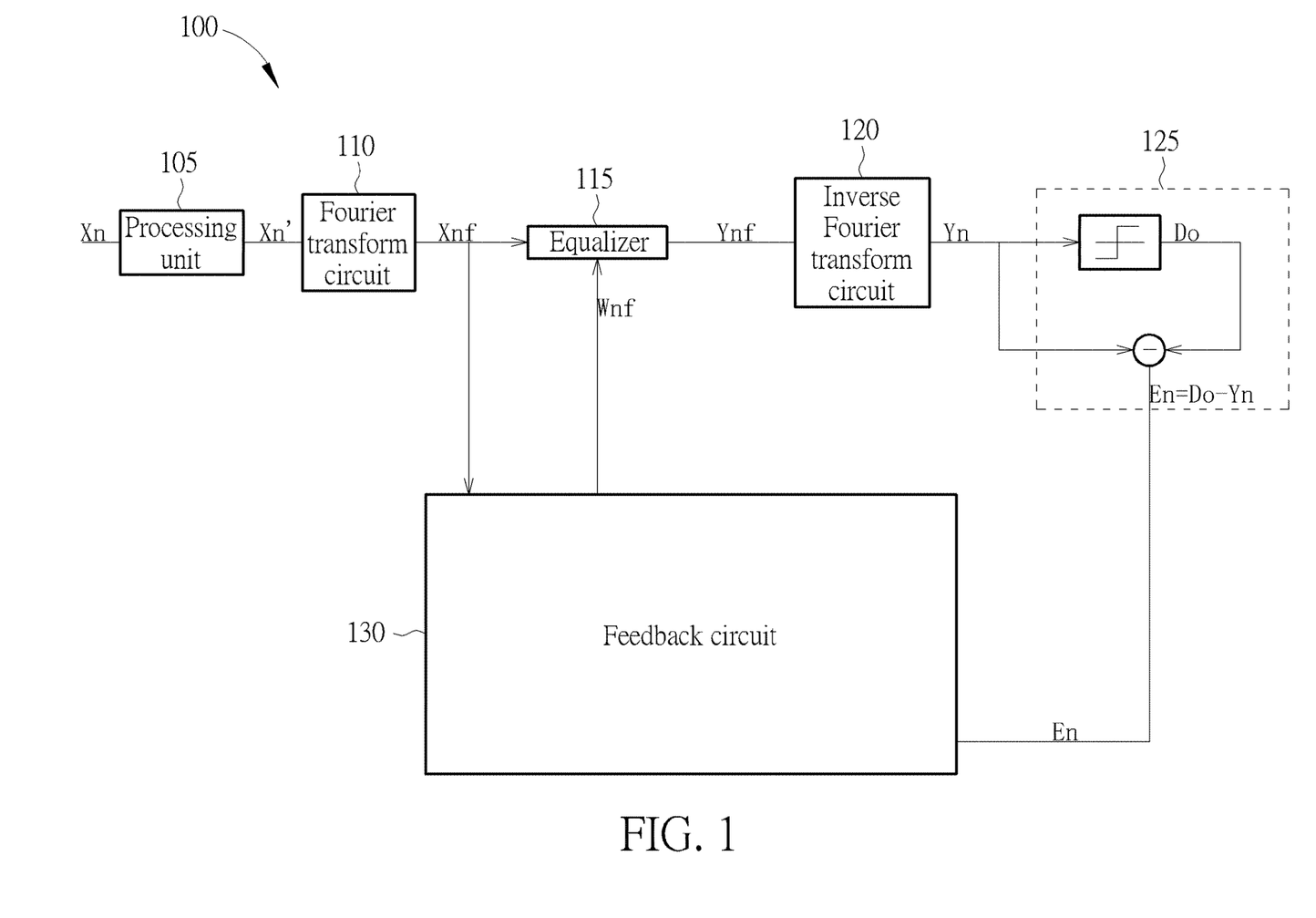
FIG. 1 is a brief block diagram illustrating a signal processing circuit in a digital domain according to an embodiment of the present invention.

Please refer to FIG. 1. FIG. 1 is a brief block diagram illustrating a signal processing circuit 100 in a digital domain according to an embodiment of the present invention, wherein the signal processing circuit 100 is, for example, a digital signal processor (DSP) of a receiver. As shown in FIG. 1, the signal processing circuit 100 comprises a processing unit 105, a Fourier transform circuit 110, an equalizer 115, an inverse Fourier transform circuit 120, a decision circuit 125, and a feedback circuit 130. The processing unit 105 is arranged to receive a time-domain input signal Xn (which is a digital signal) and generate a time-domain processed input signal Xn' by adding a random number sequence signal to the time-domain input signal Xn. The Fourier transform circuit 110 is coupled to the processing unit 105, and is arranged to receive the time-domain processed input signal Xn', and generate a frequency-domain processed input signal Xnf by performing a Fourier transform (e.g., a fast Fourier transform operation) upon the time-domain processed input signal Xn' to convert a time-domain signal into a frequency-domain signal. The equalizer 115 is coupled to the Fourier transform circuit 110, and is arranged to receive the frequency-domain processed input signal Xnf, and generate a frequency-domain output signal Ynf by performing an equalizer operation on the frequency-domain processed input signal Xnf according to its equalizer parameter Weq. The equalizer 115 is implemented by, for example, a Finite Impulse Response (FIR) equalizer and has a specific number of bits. The inverse Fourier transform circuit 120 is coupled to the equalizer 115, and is arranged to receive the frequency-domain output signal Ynf, and generate a time-domain output signal Yn by performing an inverse Fourier transform (e.g., an inverse fast Fourier transform operation) on the frequency-domain output signal Ynf to convert a frequency-domain signal into a time-domain signal. The decision circuit 125 is coupled to the inverse Fourier transform circuit 120, and is arranged to generate a decision output signal Do according to the time domain-output signal Yn, and generate a time-domain error signal En according to the decision output signal Do and the time-domain output signal Yn. For example, in practice, a slicer is used to generate the decision output signal Do, and then the time-domain output signal Yn is subtracted from the decision output signal Do to obtain the time-domain error signal En. The feedback circuit 130 is coupled to the decision circuit 125 and the equalizer 115, and is arranged to generate a specific parameter signal Wnf according to the time-domain error signal En and a conjugate signal of the frequency-domain processed input signal Xnf, wherein the specific parameter signal Wnf is used to determine the equalizer parameter Weq of the equalizer 115. The feedback circuit 130 is arranged to receive the frequency-domain processed input signal Xnf output by the Fourier transform circuit 110, and perform a conjugate operation on the frequency-domain processed input signal Xnf to obtain the conjugate signal, and then generate the specific parameter signal Wnf according to the conjugate signal and the time-domain error signal En, wherein the specific parameter signal Wnf is for feedback control of the equalizer parameter Weq of the equalizer 115.

It should be noted that the magnitude of a power spectral density (PSD) of the aforementioned random number sequence signal added by the processing unit 105 is determined by referencing the specific noise energy contained in the frequency-domain processed input signal Xnf output by the Fourier transform circuit 110. If the fixed-point finite word length is not enough, as for the embodiment shown in FIG. 1, the specific noise pattern will accumulate on the circuit elements of the feedback circuit 130 as time passes, which affects the feedback control of the equalizer 115, and then makes the equalizer coefficient drift and also makes the whole system unstable and unable to converge. Therefore, in order to solve this problem, the processing unit 105 of this embodiment is placed before the input of the Fourier transform circuit 110, and the time domain-input signal Xn is processed first to mask or reduce the specific noise of the output signal of the Fourier transform circuit 110, that is, the frequency-domain processed input signal Xnf. In practice, the specific noise is the noise that appears on at least a specific channel frequency, and the magnitude of the power spectral density of the random number sequence signal added in this embodiment is greater than the magnitude of the power spectral density of the noise that appears on at least a specific channel frequency. That is, it is equivalent to adding white noise to the input signal Xn. Specifically, the power spectral density of the white noise has the same magnitude at all frequencies, so that the influence of the noise on at least a specific channel can be masked or uniformized. In this way, the entire system can be stabilized without non-convergence. In addition, it should be noted that the above-mentioned spectral power of the noise on at least a specific channel frequency is the same regardless of the specific channel frequency, and is determined by the number of bits used by a Fourier transform circuit. Therefore, after deciding the Fourier transform circuit that is used in practice, the circuit designer can measure the spectral power of the noise on at least a specific channel frequency output by the Fourier transform circuit to determine the spectral power intensity of the random number sequence signal applied by the processing unit 105, wherein the spectral power of the noise on at least a specific channel frequency output by the Fourier transform circuit does not need to be measured again after the circuit leaves the factory.

Figure 2:
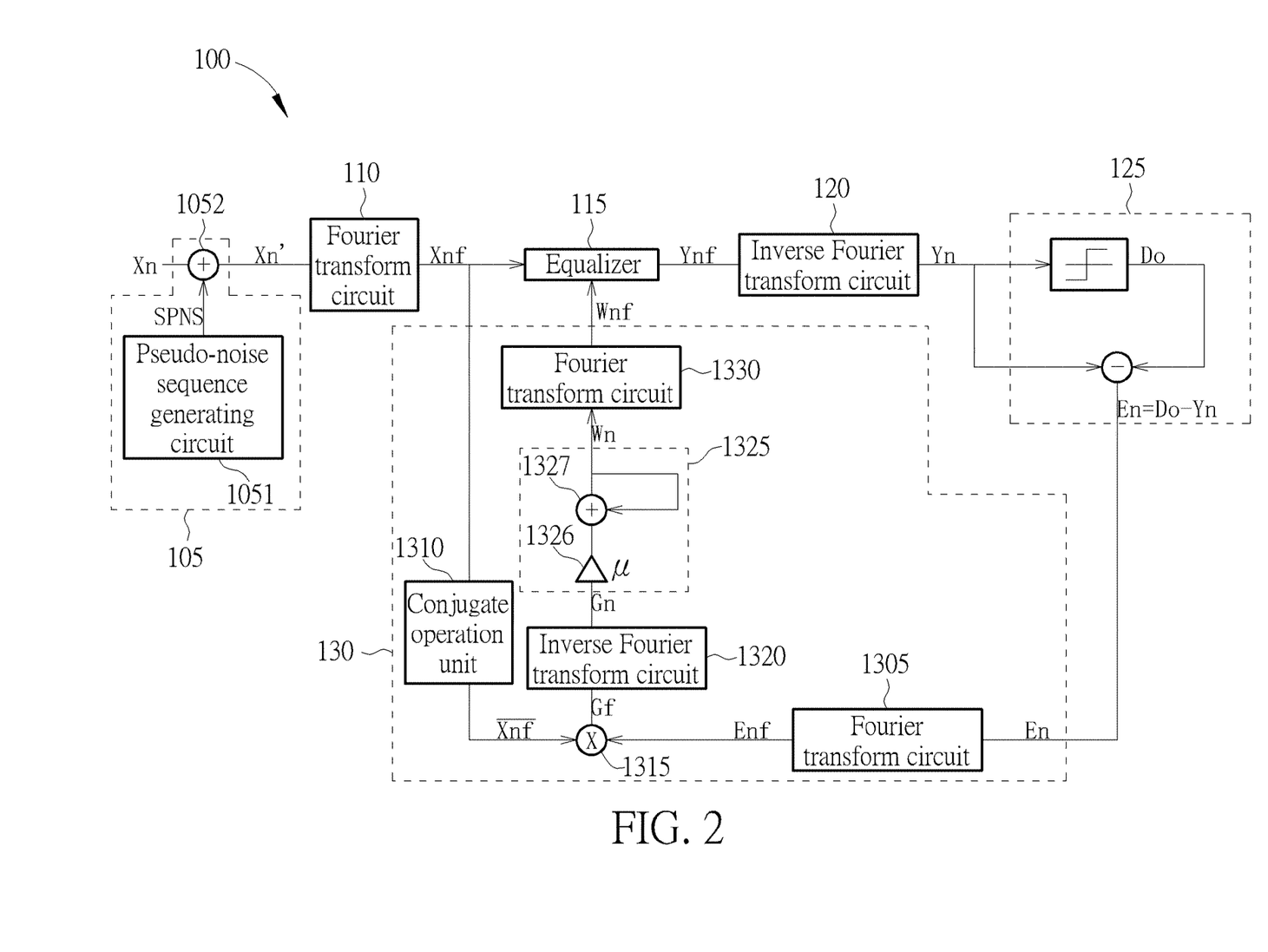
FIG. 2 is a diagram illustrating a circuit of the signal processing circuit shown in FIG. 1.
Figure 3:
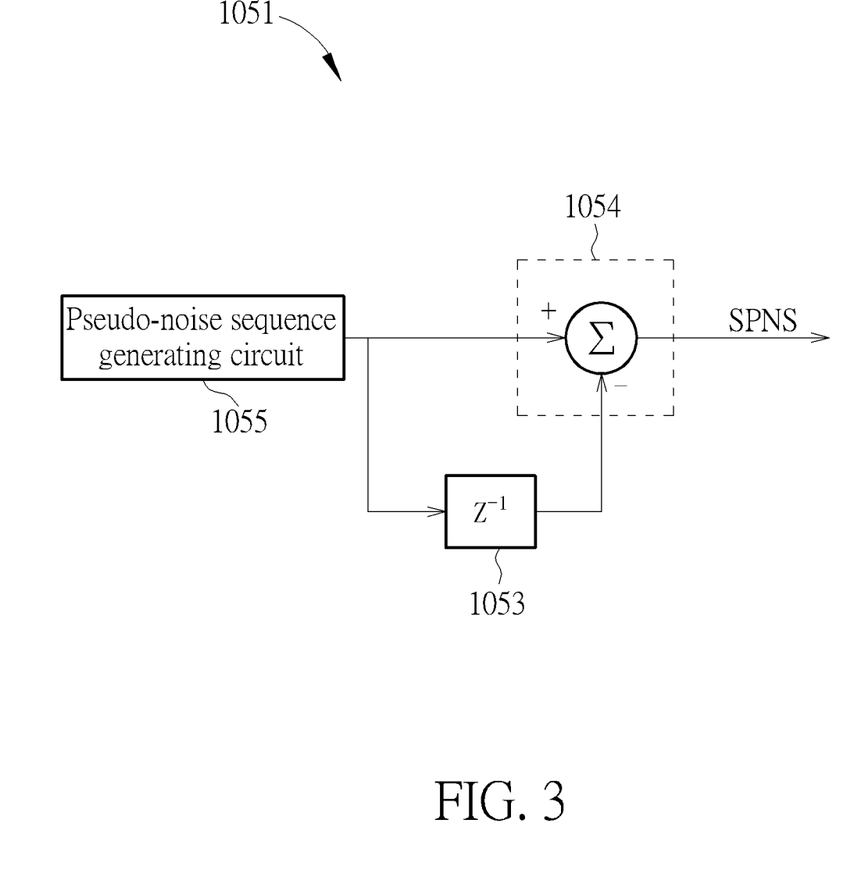
FIG. 3 is a diagram illustrating a pseudo-noise sequence generating circuit.

Please refer to FIG. 2 in conjunction with FIG. 3. FIG. 2 is a circuit diagram of the signal processing circuit 100 shown in FIG. 1. FIG. 3 is a diagram illustrating a pseudo-noise sequence generating circuit 1051. As shown in FIG. 2, in practice, the feedback circuit 130 comprises, for example, a Fourier transform circuit 1305, a conjugate operation unit 1310, a multiplication unit 1315, an inverse Fourier transform circuit 1320, a coefficient generation unit 1325, and a Fourier transform circuit 1330. The Fourier transform circuit 1305 is coupled to the decision circuit 125, and is arranged to receive the time-domain error signal En, and generate a frequency-domain error signal Enf by performing a Fourier transform (such as a fast Fourier transform operation) on the time-domain error signal En to convert a time-domain signal into a frequency-domain signal. The conjugate operation unit 1310 is coupled to the Fourier transform circuit 110, and is arranged to generate a conjugate signal $\overline{Xnf}$ by performing a conjugate operation on the frequency-domain processed input signal Xnf. The multiplication unit 1315 is coupled to the conjugate operation unit 1310 and the Fourier transform circuit 1305, and is arranged to generate a gradient signal Gf by multiplying the conjugate signal $\overline{Xnf}$ and the frequency-domain error signal Enf. The inverse Fourier transform circuit 1320 is coupled to the multiplication unit 1315, and is arranged to generate a time-domain gradient signal Gn by performing an inverse Fourier transform (such as an inverse fast Fourier transform operation) on the gradient signal Gf to convert a frequency-domain signal into a time-domain signal. The coefficient generating unit 1325 is coupled to the inverse Fourier transform circuit 1320, and is arranged to generate an accumulated parameter signal Wn by generating and accumulating parameters according to the time-domain gradient signal Gn and a specific step size μ. For example, the amplifying unit 1326 of the coefficient generating unit 1325 first generates an amplified time-domain gradient signal by multiplying the time-domain gradient signal Gn by the specific step size μ, and then the addition unit 1327 generates the accumulated parameter signal Wn by accumulating the amplified time-domain gradient signals generated at the current time point and the previous different time points. The Fourier transform circuit 1330 is coupled to the coefficient generating unit 1325, and is arranged to receive the accumulated parameter signal Wn, and generate the specific parameter signal Wnf by performing a Fourier transform (such as a fast Fourier transform operation) on the accumulated parameter signal Wn to convert a time-domain signal into a frequency-domain signal, wherein the specific parameter signal Wnf is fed back to determine the equalizer parameter Weq of the equalizer 115.

In addition, the processing unit 105 comprises, for example, a pseudo-noise sequence generating circuit 1051 and an addition unit 1052. The pseudo-noise sequence generating circuit 1051 is arranged to generate a pseudo-noise sequence signal SPNS as the random number sequence signal. The addition unit 1052 is coupled to the pseudo-noise sequence generating circuit 1051, and is arranged to receive the time-domain input signal Xn and the pseudo-noise sequence signal SPNS generated by the pseudo-noise sequence generating circuit 1051, and generate the time-domain processed input signal Xn' by adding the pseudo-noise sequence signal SPNS to the time-domain input signal Xn. As shown in FIG. 3, the pseudo-noise sequence generating circuit 1051 comprises a pseudo-noise sequence generator 1055, a delay unit 1053, and a subtraction unit 1054. The pseudo-noise sequence generator 1055 is arranged to generate a preliminary pseudo-noise sequence signal. The delay unit 1053 is coupled to the pseudo-noise sequence generator 1055, and is arranged to generate a delayed pseudo-noise sequence signal by applying a specific delay to the preliminary pseudo-noise sequence signal. Byway of example, but not limitation, the specific delay may be $z^{-1}$ shown in FIG. 3 that means a delay of one unit time; however, this is not a limitation of the present invention. The subtraction unit 1054 is arranged to receive the preliminary pseudo-noise sequence signal and the delayed pseudo-noise sequence signal, and generate the pseudo-noise sequence signal SPNS (i.e., the random number sequence signal) by subtracting the delayed pseudo-noise sequence signal from the preliminary pseudo-noise sequence signal.

It should be noted that, in the embodiment of FIG. 2, the magnitude of power spectral density of the random number sequence signal added by the processing unit 105 is determined by referencing the first specific noise energy contained in the frequency-domain processed input signal Xnf output by the Fourier transform circuit 110, as well as the signal spectral power of the second specific noise energy contained in the frequency-domain error signal Enf output by the Fourier transform circuit 1305 and the signal spectral power of the third specific noise energy contained in the specific parameter signal Wnf output by the Fourier transform circuit 1330. For example, the signal spectral power of the random number sequence signal is greater than or higher than the signal spectral power of the first specific noise energy contained in the frequency-domain processed input signal Xnf output by the Fourier transform circuit 110, and is higher than the signal spectral power of the second specific noise energy contained in the frequency-domain error signal Enf output by the Fourier transform circuit 1305, and is higher than the signal spectral power of the third specific noise energy contained in the specific parameter signal Wnf output by the Fourier transform circuit 1330, so as to cover or uniformize the influence of noise on at least a specific channel frequency in operations of all Fourier transform circuits. In this way, the entire system can be stabilized without non-convergence. Furthermore, the preliminary pseudo-noise sequence signal generated as shown in FIG. 3 is the preliminary random number sequence signal. After delaying the preliminary random number sequence signal by a unit of time, the preliminary random number sequence signal generated by the pseudo-noise sequence generator 1055 is subtracted from the preliminary random number sequence signal delayed by a unit of time, so as to equivalently generate a random number sequence signal with a second-order random number as the output of the pseudo-noise sequence generating circuit 1051, where the random number sequence signal with a second-order random number is actually less correlated with the input signal Xn, and the system can achieve stability that is based the second-order random number. However, this is not a limitation of the present invention. In other embodiments, the preliminary random number sequence signal generated by the pseudo-noise sequence generator 1055 can be directly used as the output of the pseudo-noise sequence generation circuit 1051, so that the preliminary random number sequence signal is actually irrelevant to the input signal Xn, and the system achieves stability that is based on the first-order random number. In addition, based on the operation of the same principle, in other different embodiments, the generated random number sequence signal can further be delayed and subtracted multiple times to achieve the system stability that is based on an n-order random number, where n is greater than or equal to 3.

Figure 4:
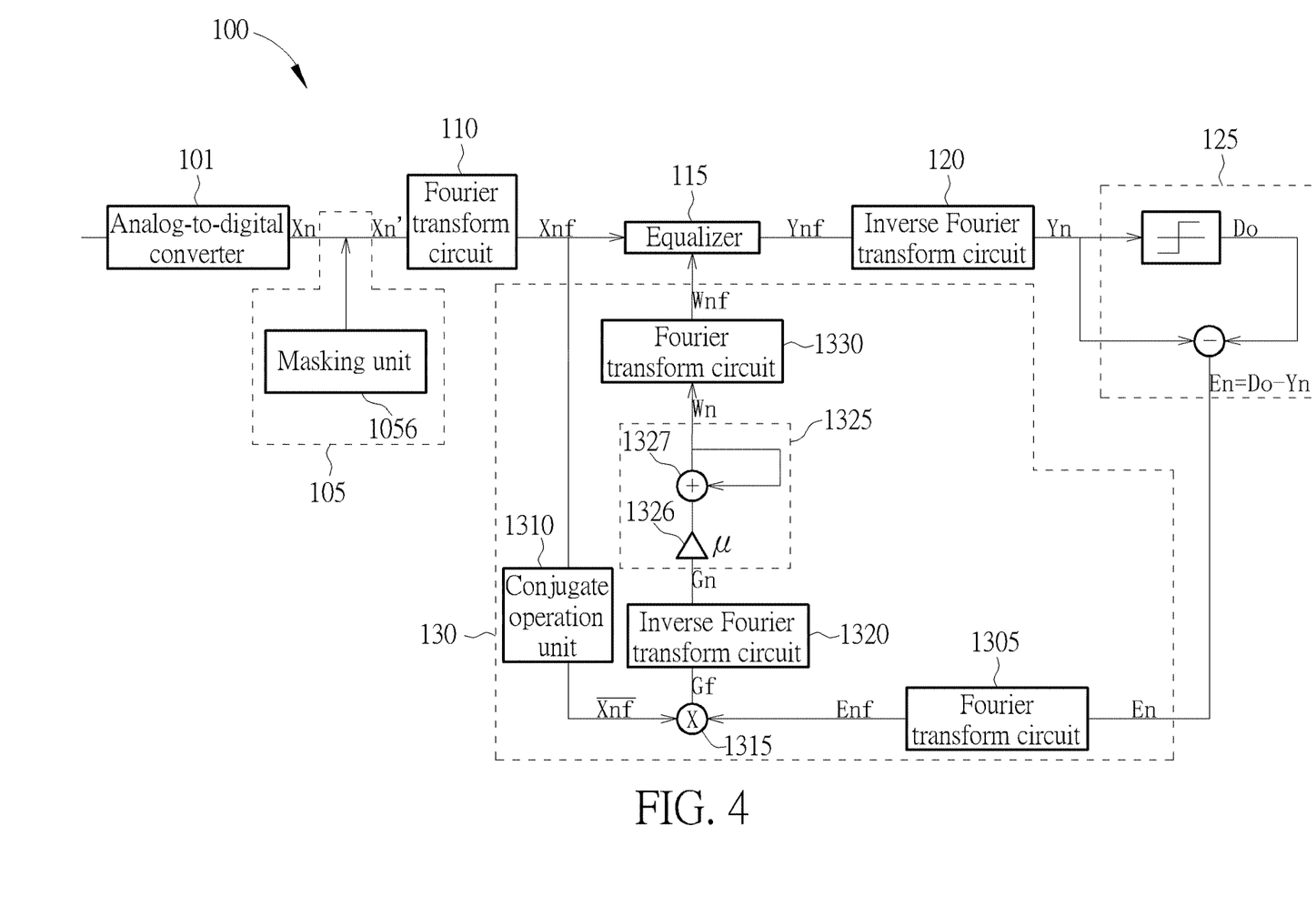
FIG. 4 is a diagram illustrating a different embodiment of the signal processing circuit shown in FIG. 1.

Please refer to FIG. 4. FIG. 4 is a diagram illustrating another embodiment of the signal processing circuit 100 shown in FIG. 1. As shown in FIG. 4, the processing unit 105 is disposed between an analog-to-digital converter 101 and the Fourier transform circuit 110, and is used to process the digital signal that is converted from an analog signal (i.e., the time-domain input signal Xn) by the analog-to-digital converter 101. The processing unit 105 comprises, for example, a masking unit 1056, wherein the masking unit 1056 is arranged to mask one or more LSBs of the signal bit resolution of the time-domain input signal Xn, so that the information of the number of bits of the signal bit resolution of the input signal Xn' generated by masking unit 1056 is lower than information of the number of bits of the signal bit resolution of the time-domain input signal Xn, which is equivalent to adding a random number sequence signal to the time-domain input signal Xn. For example, the resolution of the time-domain input signal Xn corresponds to M bits. Byway of example, but not limitation, M is equal to 8. The processing unit 305 removes the less important N LSBs (e.g., 2 LSBs, where N is equal to 2, but the present invention is not limited thereto) in the resolution of the time-domain input signal Xn and leaves other bits (i.e., 6-bit information), which is equivalent to generating the time-domain processed input signal Xn' by adding a random number sequence signal (i.e., noise signal) to the time-domain input signal Xn. In addition, the value of N is determined by referring to the first specific noise energy contained in the frequency-domain processed input signal Xnf output by the Fourier transform circuit 110, wherein noise energy of the frequency-domain processed input signal Xnf is uniformized to cover the first specific noise energy and to stabilize the system. In another embodiment, the value of N is determined by referring to the first specific noise energy contained in the frequency-domain processed input signal Xnf output by the Fourier transform circuit 110, as well as the signal spectral power of the second specific noise energy contained in the frequency-domain error signal Enf output by the Fourier transform circuit 1305 and the signal spectral power of the third specific noise energy contained in the specific parameter signal Wnf output by the Fourier transform circuit 1330, wherein noise energy of the frequency-domain processed input signal Xnf, the frequency-domain error signal Enf, and the specific parameter signal Wnf are uniformized to cover noise energy and to stabilize the system.

Figure 5:
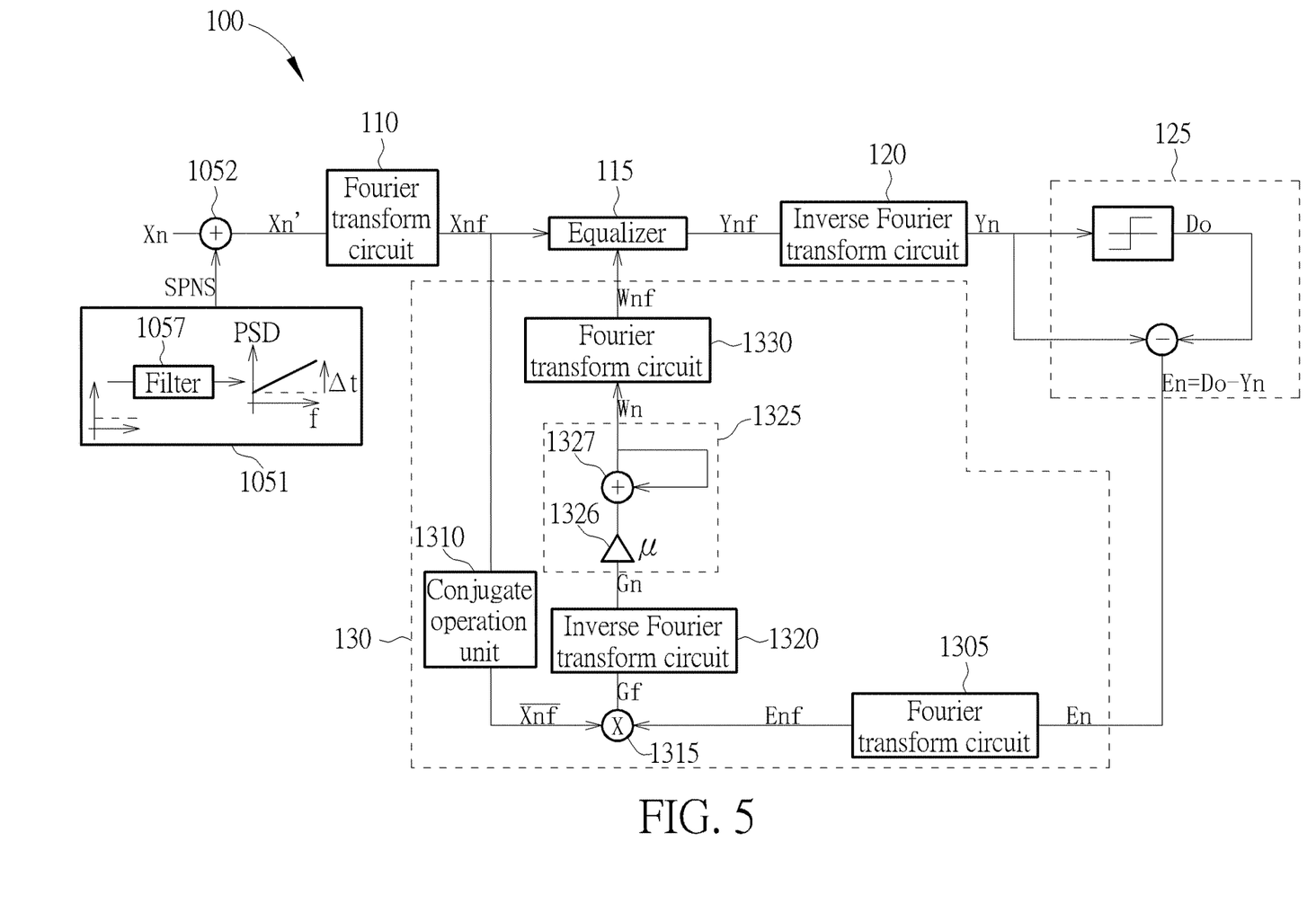
FIG. 5 is a diagram illustrating a different embodiment of the signal processing circuit shown in FIG. 1.

Please refer to FIG. 5. FIG. 5 is a diagram illustrating yet another embodiment of the signal processing circuit 100 shown in FIG. 1. As shown in FIG. 5, the processing unit 105 is disposed between the analog-to-digital converter 101 and the Fourier transform circuit 110 to process the digital signal that is converted from an analog signal (i.e., the time-domain input signal Xn) by the analog-digital converter 101. The processing unit 105 comprises, for example, a filter 1057, wherein the filter 1057 is arranged to adjust the spectral power of the output random number sequence signal for generating an adjusted random number sequence signal and outputting the adjusted random number sequence signal. The signal spectrum of the adjusted random number sequence signal increases as the signal frequency increases, or an increment of the signal spectrum power of the random number sequence signal increases as an operating temperature of the signal processing circuit rises. For example, as shown in FIG. 5, when the channel frequency is higher, the power corresponding to the adjusted random number sequence signal is higher, so that the specific noise energy output by one or more Fourier transform circuits at higher frequencies can be uniformly covered. For example, regarding a data transmission device applied to a high-speed wired network (e.g., a data transmission device that has the above-mentioned signal processing circuit 100 and is connected to a link partner device through one of Ethernet 802.3 standards), the data transmission device has, for example, a training mode and a data mode. Although the data transmission device can notify the link partner device of the parameters for feedback control that are obtained through data transmission training in the training mode, and the link partner device can communicate with the data transmission device based on the parameters of feedback control when the data transmission device is switched to the data transmission mode, the operating temperature or system ambient temperature may rise during high-speed data transmission in the data transmission mode. The system may fail to converge due to the face that the channel equalizer parameters may change significantly due to high temperature and serious insertion loss. Therefore, in order to solve the problem that the high-temperature system cannot converge, the signal processing circuit 100 adjusts the random number sequence signal with uniform spectral power at all channel frequencies. Hence, the spectral power of the adjusted random number sequence signal will increase as the frequency increases, so as to cover noise energy caused by the high temperature of high-frequency operation, and prevent the noise energy from accumulating on a specific channel frequency that may make the system unstable. In other words, in order to prevent the noise energy from accumulating on a specific high-frequency channel frequency, power of the signal spectrum of the adjusted random number sequence signal at the specific high-frequency channel frequency is greater than power of the noise energy at the specific channel frequency, and a power variation of the signal spectrum of the adjusted random number sequence signal between adjacent channel frequencies is less than a power variation of the noise energy between the specific channel frequency and the adjacent channel frequency. Since the noise energy is relatively not excessively accumulated on the specific channel frequency, the entire system can converge stably. Furthermore, in an embodiment, the shape of the power spectrum distribution of the random number sequence signal that needs to be added has a rise at high frequencies, where the degree of the rise at high frequencies can be determined according to the temperature difference that needs to be supported. For example, if the temperature difference that needs to be supported is greater, meaning that the difference in high-frequency power of the current insertion loss is greater, the required degree of the rise of the shape of the power spectrum distribution is greater at higher frequencies.

Figure 6:
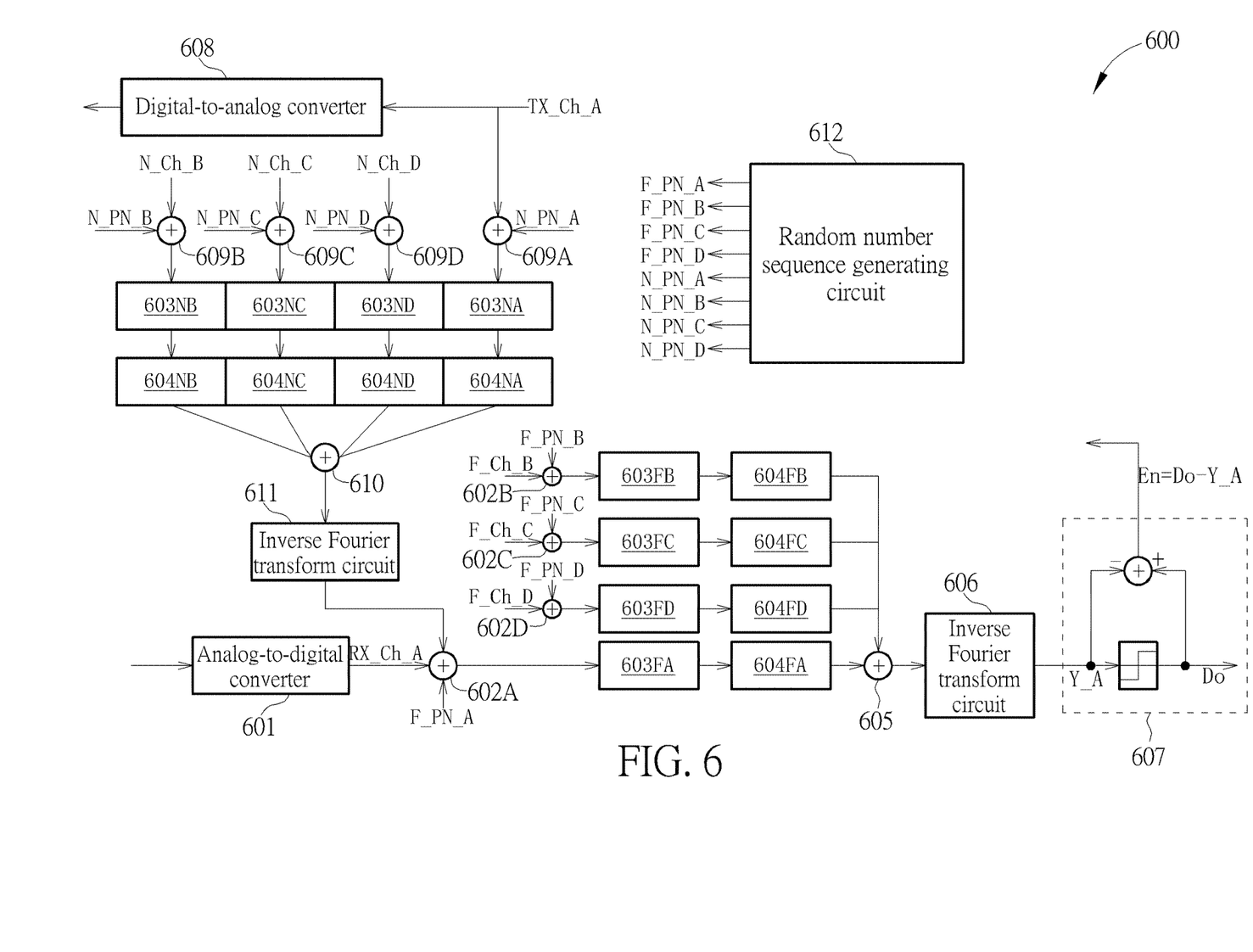
FIG. 6 is a circuit block diagram illustrating a part of the structure of a data transmission device 600 with the operation of the processing unit shown in FIG. 1 according to an embodiment of the present invention.

Please refer to FIG. 6. FIG. 6 is a circuit block diagram illustrating a part of the structure of a data transmission device 600 with the operation of the processing unit shown in FIG. 1 according to an embodiment of the present invention. As shown in FIG. 6, the data transmission device 600 comprises an analog-to-digital converter 601, addition units 602A, 602B, 602C, 602D, 609A, 609B, 609C, 609D, 605, 610, Fourier transform circuits 603FA, 603FB, 603FC, 603FD, 603NA, 603NB, 603NC, 603ND, equalizers 604FA, 604FB, 604FC, 604FD, 604NA, 604NB, 604NC, 604ND, inverse Fourier transform circuits 606, 611, a decision circuit 607, a digital-to-analog converter 608, and a random number sequence generating circuit 612. The data transmission device 600 applied to the high-speed transmission of the wired network is connected to a link partner device through Ethernet 802.3 standards. The data transmission device 600 is a transceiver device having a receiver structure and a transmitter structure, and has a 4-pair twisted pair transmission mechanism structure that includes, for example, 2 pairs of wires to receive signals and 2 pairs of wires to transmit signals, wherein the analog-to-digital converter 601, the addition unit 602, the Fourier conversion circuits 603FA, 603FB, 603FC, 603FD, the equalizers 604FA, 604FB, 604FC, 604FD, the addition unit 605, the inverse Fourier conversion circuit 606, and the decision circuit 607 are located on the receiving path of the receiver, and the digital-to-analog converter 608 is located on the transmission path of the transmitter.

A signal TX_Ch_A is a digital-domain transmission signal corresponding to a first transmitting wire, wherein the digital-to-analog converter 608 converts the digital-domain transmission signal into an analog transmission signal, and an analog transmission circuit (not shown in FIG. 6) of the data transmission device 600 transmits the analog transmission signal to a corresponding link partner device through the first transmitting wire. A signal N_Ch_B, a signal N_Ch_C, and a signal N_Ch_D refer to different digital-domain transmission signals corresponding to second, third, and fourth transmitting wires respectively. The addition unit 609A generates a first time-domain processed transmission signal to the Fourier transform circuit 603NA by adding the transmission signal TX_Ch_A corresponding to the first transmitting wire to a first near-end random number sequence signal N_PN_A corresponding to the first transmitting wire. The Fourier transform circuit 603NA is coupled to the addition unit 609A, and is arranged to generate a first frequency-domain processed transmission signal to the equalizer 604NA by transforming the first time-domain processed transmission signal from the time-domain to the frequency-domain. The equalizer 604NA is coupled to the Fourier transform circuit 603NA, and is arranged to generate a first equalized transmission signal to the addition unit 610 by performing an equalization compensation (e.g., near-end echo compensation cancellation) on the first frequency-domain processed transmission signal according to the equalizer parameters. Similarly, the addition unit 609B generates a second time-domain processed transmission signal to the Fourier transform circuit 603NB by adding the transmission signal N_Ch_B corresponding to the second transmitting wire to a second near-end random number sequence signal N_PN_B corresponding to the second transmitting wire. The Fourier transform circuit 603NB is coupled to the addition unit 609B, and is arranged to generate a second frequency-domain processed transmission signal to the equalizer 604NB by transforming the second time-domain processed transmission signal from the time-domain to the frequency-domain. The equalizer 604NB is coupled to the Fourier transform circuit 603NB, and is arranged to generate a second equalized transmission signal to the addition unit 610 by performing an equalization compensation (e.g., Near-End Crosstalk (NEXT) compensation and elimination) on the second frequency-domain processed transmission signal according to the equalizer parameters. Similarly, the operating principles of the addition units 609C and 609D are similar to those described above, and are not repeated here. Then, the addition unit 610 generates an equalized transmission result signal to the inverse Fourier transform circuit 611 by adding the first, second, third, and fourth equalized transmission signals together. The inverse Fourier transform circuit 611 is coupled to the addition unit 610, and is arranged to generate a time-domain equalized transmission result signal to the addition unit 602A by transforming the equalized transmission result signal from frequency domain to time domain.

For the receiver path, the analog-to-digital converter 601 is arranged to receive an analog received signal (an analog input signal) corresponding to a first receiving wire, and generate a digital-domain input signal RX_Ch_A (which corresponds to the first receiving wire) by converting the analog received signal from the analog domain to the digital domain. A signal F_Ch_B, a signal F_Ch_C, and a signal F_Ch_D refer to different digital-domain reception signals corresponding to the second, third, and fourth receiving wires, respectively, wherein the received signals are received from the far-end link partner device through the wires.

The addition unit 602A is coupled to the analog-to-digital converter 601, and is arranged to generate a first time-domain processed reception signal to the Fourier transform circuit 603FA by adding the input signal RX_Ch_A, an equalized transmission result signal corresponding to the transmitting wires, and a first far-end random number sequence signal F_PN_A together. The Fourier transform circuit 603FA is coupled to the addition unit 602A, and is arranged to generate a first frequency-domain processed reception signal to the equalizer 604FA by transforming the first time-domain processed reception signal from the time-domain to the-frequency domain. The equalizer 604FA is coupled to the Fourier transform circuit 603FA, and is arranged to generate a first equalized reception signal to the addition unit 605 by performing an equalization compensation on the first frequency-domain processed reception signal according to the equalizer parameters, in order to compensate for the channel response and reduce the transmission error rate of the communication system. Similarly, the addition unit 602B is coupled to another analog-to-digital converter (not shown in FIG. 6) of the data transmission device 600, and is arranged to generate a second time-domain processed reception signal to the Fourier transform circuit 603FB by adding an input signal F_Ch_A corresponding to the second receiving wire to a second far-end random number sequence signal F_PN_B. The Fourier transform circuit 603FB is coupled to the addition unit 602B, and is arranged to generate a second frequency-domain processed reception signal to the equalizer 604FB by transforming the second time-domain processed reception signal from time domain to frequency domain. The equalizer 604FB is coupled to the Fourier transform circuit 603FB, and is arranged to generate a second equalized reception signal to the addition unit 605 by performing an equalization compensation on the second frequency-domain processed reception signal according to the equalizer parameters, in order to compensate for the channel response and reduce the transmission error rate of the communication system. Similarly, the operating principles of the addition units 602C and 602D are similar to that described in the aforementioned content, and are not repeated here. The addition unit 605 then adds the first, second, third, and fourth equalized reception signals together to generate an equalized received result signal to the inverse Fourier transform circuit 606. The inverse Fourier transform circuit 606 is coupled to the addition unit 605, and is arranged to generate a time-domain output signal Y_A to the decision circuit 607 by transforming the frequency-domain equalized received result signal from frequency domain to time domain. The decision circuit 607 is coupled to the inverse Fourier transform circuit 606, and is arranged to generate a decision output signal Do according to the time-domain output signal Y_A (received signal corresponding to the first receiving wire), and generate a time-domain error signal En according to the decision output signal Do and the time-domain output signal Y_A. For example, in practice, a slicer is arranged to generate the decision output signal Do, the time-domain output signal Y_A is subtracted from the decision output signal Do to obtain the time-domain error signal En, and then the time-domain error signal En will be fed into a feedback circuit (not shown in FIG. 6) of the data transmission device 600 in order to generate equalizer parameters of the equalizer 604FA corresponding to the first receiving wire by feedback control. In addition, the time-domain error signal En can further be fed into other feedback circuits (not shown in FIG. 6) of the data transmission device 600 to generate equalizer parameters of the equalizers 604FB, the equalizer 604FC and the equalizer 604FD corresponding to the second, third, and fourth receiving wires, respectively.

It should be noted that the first near-end random number sequence signal N_PN_A, the second near-end random number sequence signal N_PN_B, the third near-end random number sequence signal N_PN_C, the fourth near-end random number sequence signal N_PN_D, the first far-end random number sequence signal F_PN_A, the second far-end random number sequence signal F_PN_B, the third far-end random number sequence signal F_PN_C, and the fourth far-end random number sequence signal F_PN_D are all generated by the random number sequence generating circuit 612, wherein the data changes of the above random number sequence signals are irrelevant to or independent of each other. In practice, the random number sequence generating circuit 612 can first generate a preliminary random number sequence signal, and then generate eight different delayed random number sequence signals by applying eight different unit delays to the preliminary random number sequence signal. Next, the eight different delayed random number sequence signals are respectively subtracted from the preliminary random number sequence signal to respectively obtain the final output random number sequence signals that are irrelevant to each other. However, this is not a limitation of the present case. In other embodiments, different generation methods can be used to generate a plurality of uncorrelated random number sequence signals.

Furthermore, the embodiment shown in FIG. 6 first generates the processed transmission signals by applying the first near-end random number sequence signal N_PN_A, the second near-end random number sequence signal N_PN_B, the third near-end random number sequence signal N_PN_C, and the fourth near-end random number sequence signal N_PN_D to transmission output signals corresponding to different transmitting wires, respectively, and then transmits the processed transmission signals to the Fourier transform circuits 603NA, 603NB, 603NC, 603ND, so as to avoid the situation that the numbers of bits respectively used by the Fourier transform circuits 603NA, 603NB, 603NC, and 603ND are not enough, resulting in convergence failure of the system. In addition, the embodiment shown in FIG. 6 generates the processed reception signals by applying the first far-end random number sequence signal F_PN_A, the second far-end random number sequence signal F_PN_B, the third far-end random number sequence signal F_PN_C, and the fourth far-end random number sequence signal F_PN_D to received signals corresponding to different receiving wires, respectively, and then transmits the processed reception signals to the Fourier transform circuits 603FA, 603FB, 603FC, and 603FD, so as to avoid the situation that the numbers of bits respectively used by the Fourier transform circuits 603FA, 603FB, 603FC, and 603FD are not enough, resulting in convergence failure of the system. Therefore, the signal spectrum power distributions of the above random number sequence signals are arranged to uniformize the accumulation of specific noise energy introduced by the corresponding Fourier transform circuits because of the insufficiency of the number of bits, so that the noise energy in the output signal of the corresponding Fourier transform circuit is relatively spread across different channel frequencies, and will not accumulate on a certain channel frequency to make the system fail to converge. The signal spectral power distributions of the aforementioned random number sequence signals are determined by referring to the numbers of bits used by corresponding Fourier transform circuits and/or referring to the spectral power distribution of specific noise energy in the output signals of the corresponding Fourier transform circuits. In the above-mentioned embodiments, when operating under the training mode, the proposed signal processing circuit stabilizes the operation of the system without divergence by generating multiple artificial noises, and after the proposed signal processing circuit enters the data transmission mode, that is, after the feedback control equalizer's coefficients are sent to a link partner device, the random number sequence generating circuit 612 shown in FIG. 6 can turn off the artificial noise (i.e., the random number sequence signals).

Since the artificial noise is no longer added to the corresponding digital signals, the system performance is improved.

In addition, it should be noted that the concept of the system architecture shown in FIG. 6 can further be applied to the architecture of one or more pairs of transmitting/receiving wires. For example, if a system uses only a pair of transmitting/receiving wires for data transmission, the random number sequence generating circuit 612 needs to generate only the random number sequence signal F_PN_A and the random number sequence signal N_PN_A, and does not need to generate other random number sequence signals mentioned above, and other circuit elements can be omitted depending on the type of design modification. Similarly, if a system uses two pairs of transmitting/receiving wires, the random number sequence generating circuit 612 needs to generate only the random number sequence signal F_PN_A, the random number sequence signal N_PN_A, the random number sequence signal F_PN_B, and the random number sequence signal N_PN_B, and does not need to generate other random number sequence signals mentioned above, and other circuit elements can be omitted depending on the type of design modification.

In summary, the present invention can avoid a phenomenon of system coefficient drift and instability caused by insufficient word length by adding artificial noise (i.e., the above-mentioned random number sequence signal) to a received signal in a digital domain, and can greatly reduce the number of fixed-point bits in a Fourier transform circuit and/or an inverse Fourier transform circuit, reduce the circuit area, and reduce the power consumption. In addition, the artificial noise used in the present invention does not impose an excessive burden on the system by either using random number sequence signals or masking the data bits of digital signals. In addition, the artificial noise used in the present invention can further change the distribution shape and magnitude of the spectral power of artificial noise according to design requirements, so that the system can avoid performance degradation caused by a large change in the channel or can avoid data transmission disconnection when the ambient temperature rises.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing circuit in a digital domain, comprising:
    a processing unit, arranged to receive a time-domain input signal, and add a random number sequence signal to the time-domain input signal to generate a time-domain processed input signal;
    a first Fourier transform circuit, coupled to the processing unit, and arranged to receive the time-domain processed input signal, and perform a first Fourier transform upon the time-domain processed input signal to generate a frequency-domain processed input signal;
    an equalizer, arranged to receive the frequency-domain processed input signal, and generate a frequency-domain output signal by performing an equalizer operation upon the frequency-domain processed input signal according to an equalizer parameter;
    a first inverse Fourier transform circuit, coupled to the equalizer, and arranged to receive the frequency-domain output signal and perform a first inverse Fourier transform upon the frequency-domain output signal to generate a time-domain output signal;
    a decision circuit, coupled to the first inverse Fourier transform circuit, and arranged to generate a decision output signal according to the time-domain output signal, and generate a time-domain error signal according to the decision output signal and the time-domain output signal; and
    a feedback circuit, coupled to the decision circuit and the equalizer, and arranged to generate a specific parameter signal according to the time-domain error signal and the frequency-domain processed input signal, to determine the equalizer parameter of the equalizer.

2. The signal processing circuit of claim 1, wherein the processing unit comprises:
    a pseudo-noise sequence generating circuit, arranged to generate a pseudo-noise sequence signal as the random number sequence signal; and
    an addition unit, coupled to the pseudo-noise sequence generating circuit, and arranged to receive the time-domain input signal and the pseudo-noise sequence signal, and add the pseudo-noise sequence signal to the time-domain input signal to generate the time-domain processed input signal.

3. The signal processing circuit of claim 2, wherein the pseudo-noise sequence generating circuit comprises:
    a pseudo-noise sequence generator, arranged to generate a preliminary pseudo-noise sequence signal;
    a delay unit, coupled to the pseudo-noise sequence generator, and arranged to apply a specific delay to the preliminary pseudo-noise sequence signal to generate a delayed pseudo-noise sequence signal; and
    a subtraction unit, arranged to subtract the delayed pseudo-noise sequence signal from the preliminary pseudo-noise sequence signal to generate the pseudo-noise sequence signal as the random number sequence signal.

4. The signal processing circuit of claim 1, wherein spectral power of the random number sequence signal added by the processing unit is determined by referring to a first specific noise energy contained in the frequency-domain processed input signal outputted by the first Fourier transform circuit.

5. The signal processing circuit of claim 4, wherein the spectral power of the random number sequence signal is higher than spectral power of the first specific noise energy.

6. The signal processing circuit of claim 1, wherein the feedback circuit comprises:
    a second Fourier transform circuit, coupled to the decision circuit, and arranged to receive the time-domain error signal, and perform a second Fourier transform upon the time-domain error signal to generate a frequency-domain error signal;
    a conjugate operation unit, coupled to the first Fourier transform circuit, and arranged to perform a conjugate operation upon the frequency-domain processed input signal to generate a conjugate signal;
    a multiplication unit, coupled to the conjugate operation unit and the second Fourier transform circuit, and arranged to multiply the conjugate signal and the frequency-domain error signal to generate a gradient signal;
    a second inverse Fourier transform circuit, coupled to the multiplication unit, and arranged to perform a second inverse Fourier transform upon the gradient signal to generate a time-domain gradient signal;

a coefficient generating unit, coupled to the second inverse Fourier transform circuit, and arranged to generate an accumulated parameter signal by generating and accumulating parameters according to the time-domain gradient signal and a specific step size; and a third Fourier transform circuit, coupled to the coefficient generating unit, and arranged to receive the accumulated parameter signal, and perform a third Fourier transform upon the time-domain error signal to generate the specific parameter signal as the equalizer parameter of the equalizer.

7. The signal processing circuit of claim 6, wherein spectral power of the random number sequence signal outputted by the processing unit is higher than spectral power of a first specific noise energy contained in the frequency-domain processed input signal outputted by the first Fourier transform circuit, higher than spectral power of a second specific noise energy contained in the frequency-domain error signal outputted by the second Fourier transform circuit, and is also higher than spectral power of a third specific noise energy contained in the specific parameter signal outputted by the third Fourier transform circuit.

8. The signal processing circuit of claim 1, wherein a resolution of the time-domain input signal corresponds to M bits, and the processing unit removes least significant N bits from the resolution of the time-domain input signal and keeps remaining bits, so as to equivalently add the random number sequence signal to the time-domain input signal to generate the time-domain processed input signal.

9. The signal processing circuit of claim 8, wherein a value of N is determined by a first specific noise energy contained in the frequency-domain processed input signal outputted by the first Fourier transform circuit.

10. The signal processing circuit of claim 1, wherein spectral power of the random number sequence signal added by the processing unit increases with an increase of a signal frequency of the random number sequence signal.

11. The signal processing circuit of claim 10, wherein an increment in the spectral power of the random number sequence signal increases with an increase of an operating temperature of the signal processing circuit.

12. The signal processing circuit of claim 1, wherein the signal processing circuit has a training mode and a data transmission mode, the processing unit adds the random number sequence signal to the time-domain input signal to generate the time-domain processed input signal under the training mode, and spectral power distribution of the random number sequence signal is determined by referring to a frequency response of the equalizer under the data transmission mode.

13. A signal processing circuit in a digital domain, comprising:

a random number sequence generating circuit, arranged to generate a first near-end random number sequence signal and a first far-end random number sequence signal, wherein the first near-end random number sequence signal corresponds to a first transmitting wire, the first far-end random number sequence signal corresponds to a first receiving wire, and the first transmitting wire and the first receiving wire are a pair of transmitting/receiving wires;

a first addition unit, arranged to receive the first near-end random number sequence signal and a digital-domain transmission signal corresponding to the first transmitting wire, and add the first near-end random number sequence signal to the digital-domain transmission signal corresponding to the first transmitting wire to generate a first time-domain processed transmission signal;

a first Fourier transform circuit, coupled to the first addition unit, and arranged to convert the first time-domain processed transmission signal into a first frequency-domain processed transmission signal;

a first equalizer, coupled to the first Fourier transform circuit, and arranged to perform a first equalization compensation upon the first frequency domain processed transmission signal to generate a first equalized transmission signal;

a first inverse Fourier transform circuit, coupled to the first equalizer, and arranged to generate a time-domain equalized transmission result signal according to the first equalized transmission signal;

a second addition unit, coupled to a digital-domain reception signal, corresponding to the first receiving wire and outputted by an analog-to-digital converter, and coupled to the first inverse Fourier transform circuit, and arranged to add the time-domain equalized transmission result signal and the first far-end random number sequence signal to the digital-domain reception signal to generate a first time-domain processed reception signal;

a second Fourier transform circuit, coupled to the second addition unit, and arranged to convert the first time-domain processed reception signal into a first frequency-domain processed reception signal;

a second equalizer, coupled to the second Fourier transform circuit, and arranged to perform a second equalization compensation upon the first frequency-domain processed reception signal to generate a first equalized reception signal;

a second inverse Fourier transform circuit, coupled to the second equalizer, and arranged to generate a time-domain output signal according to the first equalized reception signal; and a decision circuit, coupled to the second inverse Fourier transform circuit, and arranged to generate a decision output signal according to the time-domain output signal.

14. The signal processing circuit of claim 13, wherein the first near-end random number sequence signal and the first far-end random number sequence signal are irrelevant to each other.

15. The signal processing circuit of claim 13, wherein the random number sequence generating circuit further generates a second near-end random number sequence signal and a second far-end random number sequence signal, the second near-end random number sequence signal corresponds to a second transmitting wire, the second far-end random number sequence signal corresponds to a second receiving wire, the second transmitting wire and the second receiving wire are a pair of transmitting/receiving wires; and the signal processing circuit further comprises:

a third addition unit, arranged to receive the second near-end random number sequence signal and a digital-domain transmission signal corresponding to the second transmitting wire, and add the second near-end random number sequence signal to the digital-domain transmission signal corresponding to the second transmitting wire to generate a second time-domain processed transmission signal;

a third Fourier transform circuit, coupled to the third addition unit, and arranged to convert the second time-domain processed transmission signal into a second frequency-domain processed transmission signal;

a third equalizer, coupled to the third Fourier transform circuit, and arranged to perform a third equalization compensation upon the second frequency-domain processed transmission signal to generate a second equalized transmission signal, wherein the first inverse Fourier transform circuit generates the time-domain equalized transmission result signal according to the first equalized transmission signal and the second equalized transmission signal;

a fourth addition unit, arranged to add the first far-end random number sequence signal to a digital-domain reception signal corresponding to the second receiving wire to generate a second time-domain processed reception signal;

a fourth Fourier transform circuit, coupled to the fourth addition unit, and arranged to convert the second time-domain processed reception signal into a second frequency-domain processed reception signal; and a fourth equalizer, coupled to the fourth Fourier transform circuit, and arranged to perform a fourth equalization compensation upon the second frequency-domain processed reception signal to generate a second equalized reception signal, wherein the second inverse Fourier transform circuit generates the time-domain output signal according to the first equalized reception signal and the second equalized reception signal;

wherein the decision circuit generates a time-domain error signal according to the decision output signal and the time domain output signal, to determine an equalizer parameter of the second equalizer and an equalizer parameter of the fourth equalizer.

16. The signal processing circuit of claim 15, wherein the first near-end random number sequence signal, the first far-end random number sequence signal, the second near-end random number sequence signal, and the second far-end random number sequence signals are irrelevant to each other.

17. A signal processing method in a digital domain, comprising:
receiving a time-domain input signal, and adding a random number sequence signal to the time-domain input signal to generate a time-domain processed input signal;

receiving the time-domain processed input signal, and performing a first Fourier transform upon the time-domain processed input signal to generate a frequency-domain processed input signal;

receiving the frequency-domain processed input signal, and generating a frequency-domain output signal by performing an equalizer operation upon the frequency-domain processed input signal according to an equalizer parameter;

receiving the frequency-domain output signal, and performing a first inverse Fourier transform upon the frequency-domain output signal to generate a time-domain output signal;

generating a decision output signal according to the time-domain output signal, and generating a time-domain error signal according to the decision output signal and the time-domain output signal; and generating a specific parameter signal according to the time-domain error signal and the frequency-domain processed input signal, to determine the equalizer parameter of the equalizer.

18. The signal processing method of claim 17, wherein spectral power of the random number sequence signal is higher than spectral power of a specific noise energy contained in the frequency-domain processed input signal.

19. The signal processing method of claim 17, wherein a resolution of the time-domain input signal corresponds to M bits, and the step of adding the random number sequence signal to the time-domain input signal to generate the time-domain processed input signal comprise:
removing least significant N bits from the resolution of the time-domain input signal and keeping remaining bits, so as to equivalently add the random number sequence signal to the time-domain input signal to generate the time-domain processed input signal.

20. The signal processing method of claim 17, wherein spectral power of the random number sequence signal increases with an increase of a signal frequency of the random number sequence signal.

* * * * *